(12) United States Patent
Ohm et al.

(10) Patent No.: US 12,151,569 B2
(45) Date of Patent: Nov. 26, 2024

(54) FUEL CELL VEHICLE

(71) Applicants: Hyundai Motor Company, Seoul (KR); Kia Corporation, Seoul (KR)

(72) Inventors: Ki Wook Ohm, Yongin-si (KR); Myung Jin Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 184 days.

(21) Appl. No.: 17/964,632

(22) Filed: Oct. 12, 2022

(65) Prior Publication Data

US 2023/0182584 A1 Jun. 15, 2023

(30) Foreign Application Priority Data

Dec. 9, 2021 (KR) .................. 10-2021-0175935

(51) Int. Cl.
| | | |
|---|---|---|
| *H01M 8/04* | (2016.01) | |
| *B60L 50/72* | (2019.01) | |
| *H01M 8/0202* | (2016.01) | |
| *H01M 8/24* | (2016.01) | |

(52) U.S. Cl.
CPC .......... *B60L 50/72* (2019.02); *H01M 8/0202* (2013.01); *H01M 8/24* (2013.01); *H01M 2250/20* (2013.01)

(58) Field of Classification Search
CPC ..................................................... B60L 50/72
See application file for complete search history.

(56) References Cited

U.S. PATENT DOCUMENTS

| | | | |
|---|---|---|---|
| 7,673,738 B2 | 3/2010 | McConnell | |
| 2002/0187382 A1* | 12/2002 | Nishiumi | H01M 8/241 |
| | | | 429/456 |
| 2012/0126536 A1 | 5/2012 | Takita | |
| 2013/0119758 A1 | 5/2013 | Takamatsu et al. | |
| 2017/0088182 A1* | 3/2017 | Hara | B62D 25/2072 |
| 2023/0106658 A1* | 4/2023 | Kim | H01M 4/505 |
| | | | 252/182.1 |
| 2024/0072283 A1* | 2/2024 | Ohm | B60L 58/40 |

FOREIGN PATENT DOCUMENTS

| | | |
|---|---|---|
| CN | 206374566 U | 8/2017 |
| CN | 212107958 U | 12/2020 |
| JP | 2019111837 A | 7/2019 |
| KR | 100872642 B1 | 12/2008 |

* cited by examiner

*Primary Examiner* — Jared Fureman
*Assistant Examiner* — Esayas G Yeshaw
(74) *Attorney, Agent, or Firm* — Slater Matsil, LLP

(57) ABSTRACT

An embodiment fuel cell vehicle includes a fuel cell, a power distributor disposed on the fuel cell and configured to receive power generated by the fuel cell, a voltage cable connected to a rear side of the power distributor, and a cable bumper coupled to the rear side of the power distributor and surrounding a portion of the voltage cable.

20 Claims, 22 Drawing Sheets

FUEL CELL VEHICLE

CROSS-REFERENCE TO RELATED APPLICATIONS

This application claims the benefit of Korean Patent Application No. 10-2021-0175935, filed on Dec. 9, 2021, which application is hereby incorporated herein by reference.

TECHNICAL FIELD

Embodiments relate to a fuel cell vehicle.

BACKGROUND

A fuel cell is a power generation device in which hundreds of stacked unit cells generate electricity. The generated electricity is collected in current collectors disposed at respective end portions of a cell stack, and is transferred to various parts through a power distributor disposed at the upper end of the cell stack. However, high-voltage cables, which are connected to the power distributor to transfer power to various parts, may come into contact with a dash panel of a fuel cell vehicle in the event that the fuel cell vehicle is in a collision, which leads to various problems, such as combustion or explosion of the fuel cell vehicle or electric shock. Therefore, research with the goal of preventing the above problems is underway.

SUMMARY

Accordingly, embodiments are directed to a fuel cell vehicle that may substantially obviate one or more problems due to limitations and disadvantages of the related art.

Embodiments provide a fuel cell vehicle that may protect voltage cables in the event of a collision involving the same.

However, the features that may be accomplished by the embodiments are not limited to the above-mentioned features, and other features not mentioned herein will be clearly understood by those skilled in the art from the following description.

A fuel cell vehicle according to an embodiment may include a fuel cell, a power distributor configured to receive power generated by the fuel cell and disposed on the fuel cell, a voltage cable connected to the rear side of the power distributor, and a cable bumper coupled to the rear side of the power distributor so as to surround at least a portion of the voltage cable.

For example, the fuel cell may include a cell stack configured such that a plurality of unit cells is stacked in a direction intersecting the direction in which the fuel cell vehicle travels.

For example, the cable bumper may be located between the rear side of the power distributor and a dash panel of the fuel cell vehicle, which faces the voltage cable in the direction in which the fuel cell vehicle travels.

For example, the cable bumper may be detachably coupled to the rear side of the power distributor.

For example, the power distributor may include a housing, at least one cable terminal disposed at the rear side of the housing so as to be connected to the voltage cable, and a box-coupling portion disposed at the rear side of the housing so as to be coupled to the cable bumper.

For example, the first lower surface of the cable bumper may be located at a higher position than, or at the same height as, the second lower surface of the housing from the ground.

For example, the box-coupling portion may include first to $N^{th}$ (where "N" is a positive integer of 2 or greater) box-coupling portions disposed at the rear side of the housing so as to be spaced apart from each other in a second direction intersecting a first direction, which is parallel to the direction in which the fuel cell vehicle travels, and the cable bumper may include first to $N^{th}$ bumper-coupling portions respectively coupled to the first to $N^{th}$ box-coupling portions.

For example, one of an $n^{th}$ ($1 \leq n \leq N$) box-coupling portion and an $n^{th}$ bumper-coupling portion coupled to the $n^{th}$ box-coupling portion may include a protruding portion protruding in the first direction, and the remaining one of the $n^{th}$ box-coupling portion and the $n^{th}$ bumper-coupling portion may include a recessed portion formed therein to receive the protruding portion therein.

For example, the cable bumper may include a first portion having a shape of a bar extending in the second direction, a second portion protruding from one of the two end portions of the front surface of the first portion in the first direction toward the rear side of the power distributor so as to be coupled to one of the first to $N^{th}$ box-coupling portions, and a third portion protruding from the remaining one of the two end portions of the front surface of the first portion in the first direction toward the rear side of the power distributor so as to be coupled to another one of the first to $N^{th}$ box-coupling portions. Each of the inner surfaces of the first portion, the second portion, and the third portion may define a first receiving hole to surround the voltage cable.

For example, the cable bumper may further include a fourth portion protruding from a middle portion between the two end portions of the front surface of the first portion in the first direction toward the rear side of the power distributor so as to be coupled to still another one of the first to $N^{th}$ box-coupling portions. The inner surfaces of the first portion, the second portion, and the fourth portion may define a second receiving hole to receive a portion of the voltage cable, and the inner surfaces of the first portion, the third portion, and the fourth portion may define a third receiving hole to receive a portion of the voltage cable.

For example, the voltage cable may include a connection portion connected to the cable terminal and an extension portion bent and extending from the connection portion in a third direction, intersecting the first direction and the second direction. At least a portion of the extension portion and the connection portion may be received in the receiving hole.

For example, the cable bumper may include a shock-absorbing member disposed in at least one of the first portion, the second portion, or the third portion.

For example, the shock-absorbing member may include a first shock-absorbing member disposed in the second portion and a second shock-absorbing member disposed in the third portion.

For example, the cable bumper may further include a fifth portion spaced apart from the first portion in the first direction. The shock-absorbing member may include a third shock-absorbing member, disposed at a position aligned to be overlapped with the second portion in the first direction in the space between the first portion and the fifth portion, and a fourth shock-absorbing member, disposed at a position aligned to be overlapped with the third portion in the first direction in the space between the first portion and the fifth portion.

For example, the shock-absorbing member may include a fifth shock-absorbing member disposed on the rear surface of the first portion, which is formed opposite the front surface of the first portion.

For example, the fifth shock-absorbing member may include a plurality of fifth shock-absorbing members disposed so as to be spaced apart from each other in the second direction.

For example, the cable bumper may have a first rigidity, and at least one of the first portion, the second portion, or the third portion may include a shock-dispersing member having a second rigidity lower than the first rigidity.

For example, the shock-dispersing member may include a first shock-dispersing member disposed in the second portion and a second shock-dispersing member disposed in the third portion.

For example, the shock-dispersing member may be disposed so as to be embedded in the first portion.

For example, the first portion may include a first area aligned to be overlapped with the second portion in the first direction, a second area aligned to be overlapped with the third portion in the first direction, and a third area formed between the first area and the second area. The shock-dispersing member may be disposed in the entirety of the third area or around the middle portion of the third area.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell vehicle 100 according to embodiments will be described with reference to the accompanying drawings. The fuel cell vehicle 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. Hereinafter, for convenience of description, the x-axis direction, which is the direction in which the fuel cell vehicle 100 travels or a direction parallel to the direction in which the fuel cell vehicle 100 travels, will be referred to as a "first direction", the y-axis direction will be referred to as a "second direction", and the z-axis direction will be referred to as a "third direction".

Figure 1:
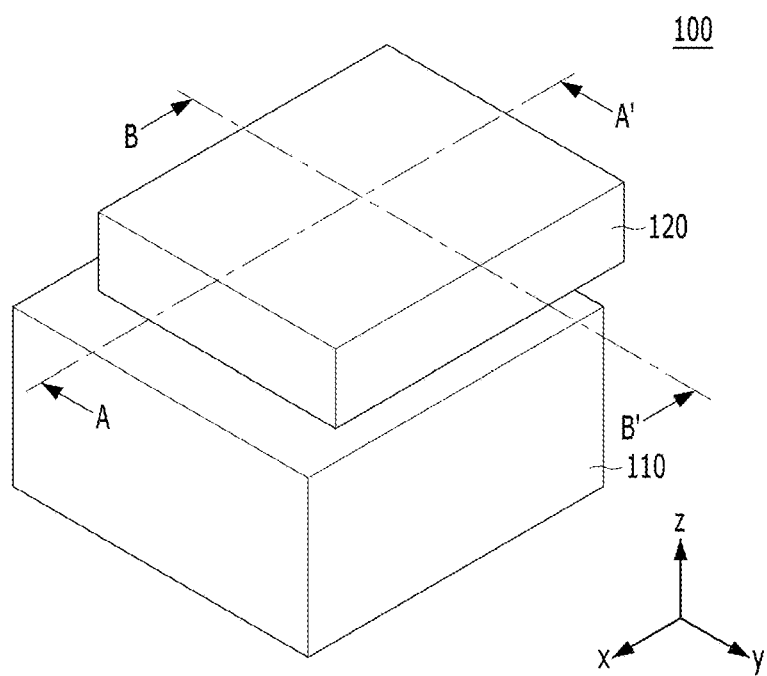
FIG. 1 is a perspective view of a fuel cell vehicle according to an embodiment.
Figure 2:
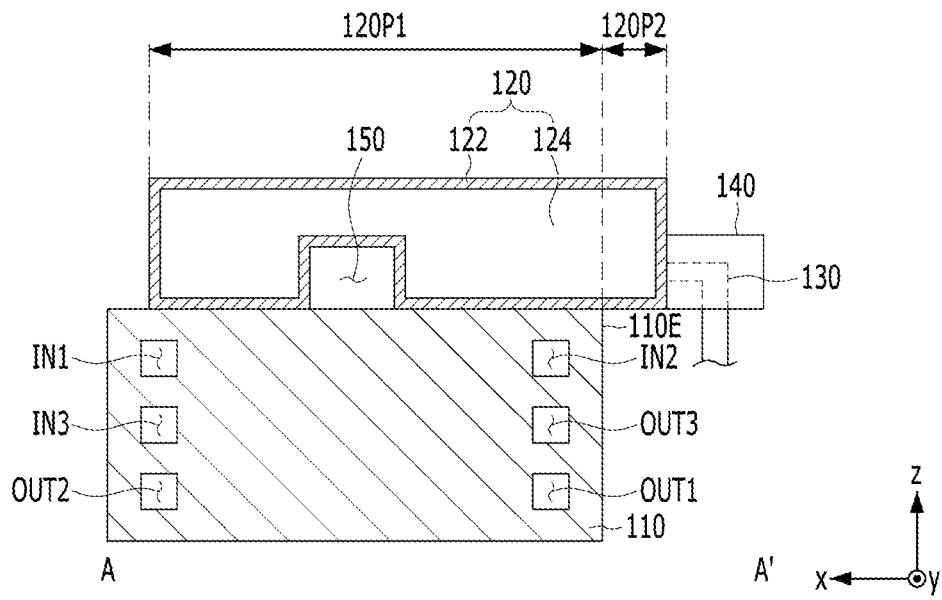
FIG. 2 is a cross-sectional view taken along line A-A' in FIG. 1.
Figure 3:
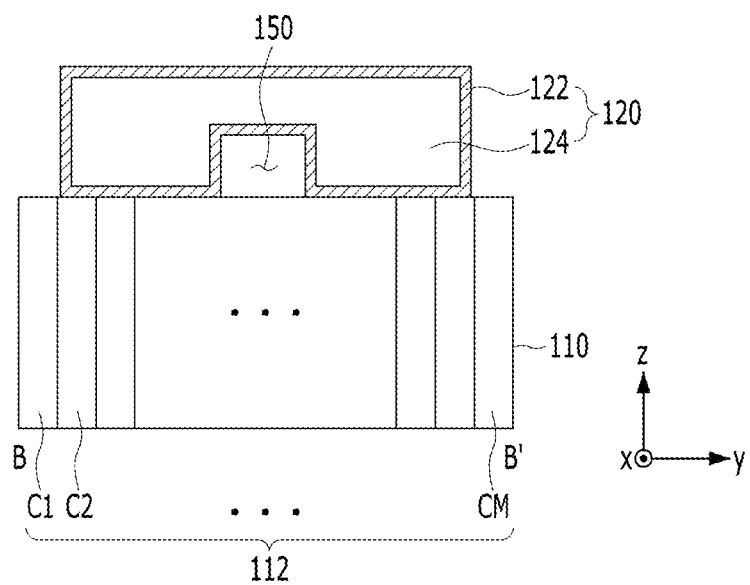
FIG. 3 is a cross-sectional view taken along line B-B' in FIG. 1.
Figure 4:
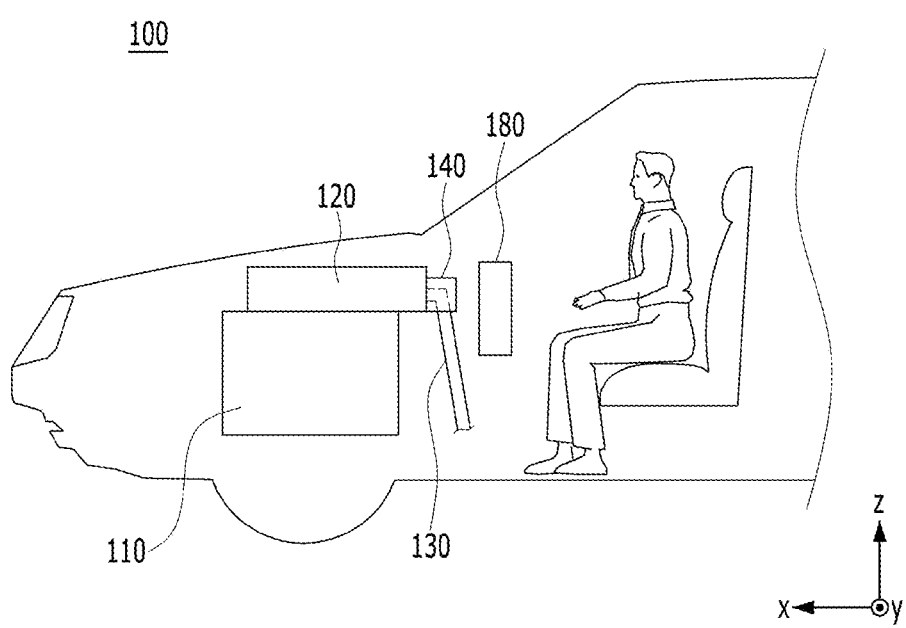
FIG. 4 is a view schematically showing the shape of the fuel cell vehicle according to an embodiment when viewed from the left.
Figure 5:
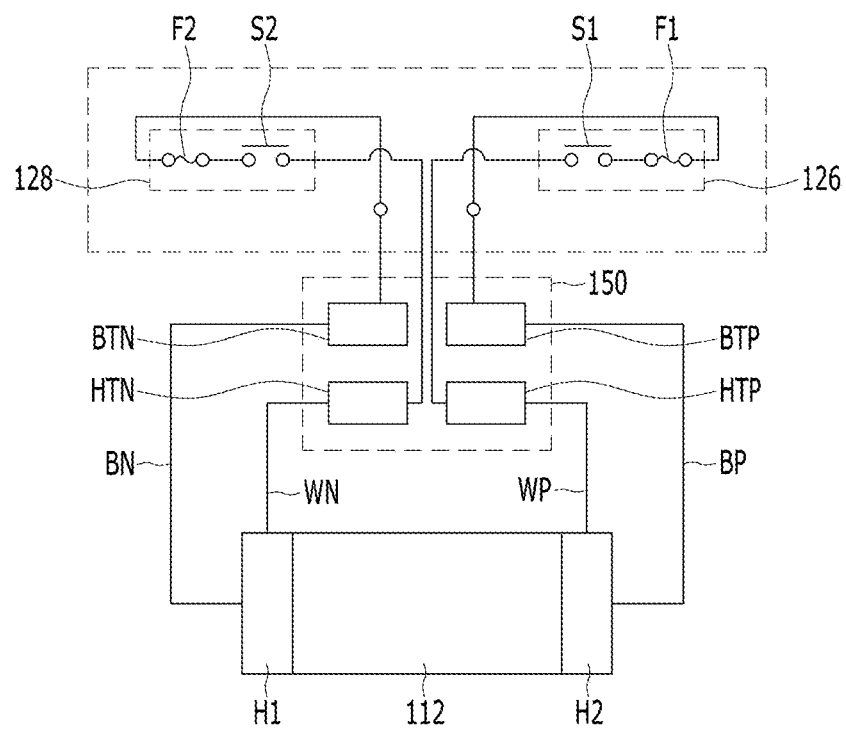
FIG. 5 is a schematic wiring diagram of the fuel cell vehicle according to an embodiment.

FIG. 1 is a perspective view of a fuel cell vehicle 100 according to an embodiment. FIG. 2 is a cross-sectional view taken along line A-A' in FIG. 1. FIG. 3 is a cross-sectional view taken along line B-B' in FIG. 1. FIG. 4 is a view schematically showing the shape of the fuel cell vehicle 100 according to an embodiment when viewed from the left. FIG. 5 is a schematic wiring diagram of the fuel cell vehicle 100 according to an embodiment.

The fuel cell vehicle 100 according to an embodiment may include a fuel cell 110, a power distributor (a high-voltage junction box or a junction box) 120, a voltage cable (or a high-voltage cable) 130, a cable bumper 140, and a dash panel 180. In addition, the fuel cell vehicle 100 may further include a terminal block 150.

The fuel cell 110 may be, for example, a polymer electrolyte membrane fuel cell (or a proton exchange membrane fuel cell) (PEMFC), which has been studied most extensively as a power source for driving vehicles. However, the embodiments are not limited to any specific form of fuel cell 110.

The fuel cell 110 may include a cell stack 112, heaters H1 and H2, a positive bus bar BP, a negative bus bar BN, a positive wire WP, a negative wire WN, and current collectors (or current-collecting terminals) (not shown).

The cell stack 112 may include a plurality of unit cells C1, C2, ..., and CM, which are stacked in the second direction, which intersects the first direction, which is the direction in which the fuel cell vehicle 100 travels. Here, "M" is a positive integer of 1 or greater, and may range from several tens to several hundreds. "M" may range, for example, from 100 to 300, but the embodiments are not limited to any specific value of "M". Each unit cell Cm may generate 0.6 volts to 1.0 volt of electricity. Here, $1 \leq m \leq M$. "M" may be determined depending on the intensity of the power to be supplied from the fuel cell 110 to a load. Here, "load" may refer to a part that requires power in the fuel cell vehicle 100. As described above, the fuel cell 110 included in the fuel cell vehicle 100 according to the embodiment is of a transverse type, but the embodiments are not limited thereto.

In addition, although not shown, the fuel cell 110 may further include a first end plate and a second end plate disposed at respective end portions of the cell stack 112. At least one of the first end plate or the second end plate and the cell stack 112 may include a first inflow communication portion (or a first inlet manifold) IN1, a second inflow communication portion IN2, a third inflow communication portion IN3, a first outflow communication portion (or a first outlet manifold) OUT1, a second outflow communication portion OUT2, and a third outflow communication portion OUT3.

Hydrogen may flow into the cell stack 112 through the first inflow communication portion IN1 from the outside, oxygen may flow into the cell stack 112 through the second inflow communication portion IN2 from the outside, and a cooling medium may flow into the cell stack 112 through the third inflow communication portion IN3 from the outside.

Further, hydrogen, which is a reactant gas, may flow out of the cell stack 112 through the first outflow communication portion OUT1, oxygen, which is a reactant gas, and condensate water may flow out of the cell stack 112 through the second outflow communication portion OUT2, and a cooling medium may flow out of the cell stack 112 through the third outflow communication portion OUT3.

The first to third inflow communication portions IN1, IN2, and IN3 and the first to third outflow communication portions OUT1, OUT2, and OUT3 shown in FIG. 2 are merely illustrative. The fuel cell vehicle 100 according to the embodiments is not limited as to the specific positions or specific shapes of the communication portions.

The stack voltage generated by and output from the fuel cell 110 corresponds to the potential difference between the positive output terminal and the negative output terminal of the fuel cell 110. The positive output terminal may be connected to the terminal block 150 via the positive bus bar BP, and the negative output terminal may be connected to the terminal block 150 via the negative bus bar BN.

The first heater H1 may be disposed at one end portion of the cell stack 112, and may be connected to the negative wire WN. The second heater H2 may be disposed at the other end of the cell stack 112, and may be connected to the positive wire WP.

In the fuel cell 110, the heaters H1 and H2 and the current collectors may be connected to the power distributor 120 via the terminal block 150. To this end, the positive bus bar BP and the negative bus bar BN may electrically connect the current collectors to the terminal block 150, and the positive wire WP and the negative wire WN may electrically connect the heaters H1 and H2 to the terminal block 150. The current collector that is in contact with the first heater H1 will be referred to as a "first current collector", and the current collector that is in contact with the second heater H2 will be referred to as a "second current collector".

The terminal block 150 may include positive and negative bus terminal portions BTP and BTN and positive and negative heater terminal portions HTP and HTN.

For example, the negative bus bar BN may electrically connect the first current collector to the negative bus terminal portion BTN of the terminal block 150, and the positive bus bar BP may electrically connect the second current collector to the positive bus terminal portion BTP of the terminal block 150. Since the negative bus bar BN and the positive bus bar BP connect the first and second current collectors to the terminal block 150, the electricity generated by the cell stack 112 may be transferred to the power distributor 120 through the terminal block 150. To this end, each of the negative bus bar BN and the positive bus bar BP may be implemented as a conductor.

Further, the negative wire WN may electrically connect the first heater H1 to the negative heater terminal portion HTN of the terminal block 150, and the positive wire WP may electrically connect the second heater H2 to the positive heater terminal portion HTP of the terminal block 150.

Accordingly, the positive bus terminal portion BTP may be connected to the positive bus bar BP, the negative bus terminal portion BTN may be connected to the negative bus bar BN, the positive heater terminal portion HTP may be connected to the positive wire WP, and the negative heater terminal portion HTN may be connected to the negative wire WN. To this end, conductive wires may be disposed in the terminal block 150.

Although not shown, these components (BTP and BP), (BTN and BN), (HTP and WP), and (HTN and WN) may be connected to each other by means of electrically conductive bolts or the like, but the embodiments are not limited to any specific connection structure between the components (BTP and BP), (BTN and BN), (HTP and WP), and (HTN and WN).

The terminal portions BTP, BTN, HTP, and HTN of the terminal block 150 serve to connect the bus bars BP and BN and the wires WP and WN, included in the fuel cell 110, to the power distributor 120.

The wiring diagram shown in FIG. 5 is provided to help understand the embodiment. The fuel cell vehicle 100 according to the embodiments is not limited as to the specific wiring structure between the fuel cell 110 and the terminal block 150 or the specific configuration of the terminal block 150.

The power distributor 120 may serve to receive the power generated by the fuel cell 110 through the terminal block 150 and to distribute the received power to peripheral high-voltage parts for driving the fuel cell vehicle 100 (e.g., loads of the vehicle) through the voltage cable 130.

For example, the power distributor 120 may include first and second switching units 126 and 128.

The first switching unit 126 may be disposed between the positive wire WP and the positive bus bar BP, and the second switching unit 128 may be disposed between the negative wire WN and the negative bus bar BN.

Referring to FIG. 5, the positive bus terminal portion BTP of the terminal block 150 connects the positive bus bar BP to the first end portion of the first switching unit 126. The positive heater terminal portion HTP connects the positive wire WP to the second end portion of the first switching unit 126, which is opposite the first end portion. The negative bus terminal portion BTN connects the negative bus bar BN to the third end portion of the second switching unit 128. The negative heater terminal portion HTN connects the negative wire WN to the fourth end portion of the second switching unit 128, which is opposite the third end portion.

The first switching unit 126 may include a first fuse F1 and a first switch S1. The first fuse F1 may have one side connected to the first end portion of the first switching unit 126, and the first switch S1 may be disposed between the other side of the first fuse F1 and the second end portion of the first switching unit 126.

The second switching unit 128 may include a second fuse F2 and a second switch S2. The second fuse F2 may have one side connected to the third end portion of the second switching unit 128, and the second switch S2 may be disposed between the other side of the second fuse F2 and the fourth end portion of the second switching unit 128.

When the first switching unit 126 and the second switching unit 128 are switched on, current may be supplied to the first and second heaters H1 and H2 to form a closed loop, and thus the first and second heaters H1 and H2 may emit heat.

The power distributor 120 and the fuel cell 110 may be located at the center of the engine compartment of the fuel cell vehicle 100. The power distributor 120 may be disposed on the fuel cell 110.

According to an embodiment, as shown in FIG. 2, the power distributor 120 may include a portion 120P1 and a remaining portion 120P2. The portion 120P1 may be disposed on the fuel cell 110, and the remaining portion 120P2 may protrude from the portion 120P1 beyond the end 110E of the fuel cell 110 toward the rear side of the fuel cell vehicle 100, i.e., in the −x-axis direction.

According to another embodiment, unlike what is illustrated in FIG. 2, the entirety of the power distributor 120 may be disposed on the fuel cell 110. That is, not only the portion 120P1 but also the remaining portion 120P2 may be disposed on the fuel cell 110.

The voltage cable 130 may be connected to the rear side of the power distributor 120. Specifically, the voltage cable 130 may be connected to the remaining portion 120P2 of the power distributor 120.

The cable bumper 140 according to the embodiment may be coupled to the rear side of the power distributor 120 so as to surround at least a portion of the voltage cable 130.

Referring to FIG. 4, the dash panel 180 is disposed behind the power distributor 120.

The cable bumper 140 may be located between the part (e.g., the dash panel 180) that is located closest to the voltage cable 130 in the first direction, which is the direction in which the fuel cell vehicle 100 travels, and the rear side of the power distributor 120.

According to an embodiment, the cable bumper 140 may be detachably coupled to the rear side of the power distributor 120.

According to another embodiment, the cable bumper 140 may be integrated with the power distributor 120.

Hereinafter, the power distributor 120, the voltage cable 130, and the cable bumper 140 included in the fuel cell vehicle 100 according to an embodiment will be described in detail with reference to the accompanying drawings.

Figure 6A:
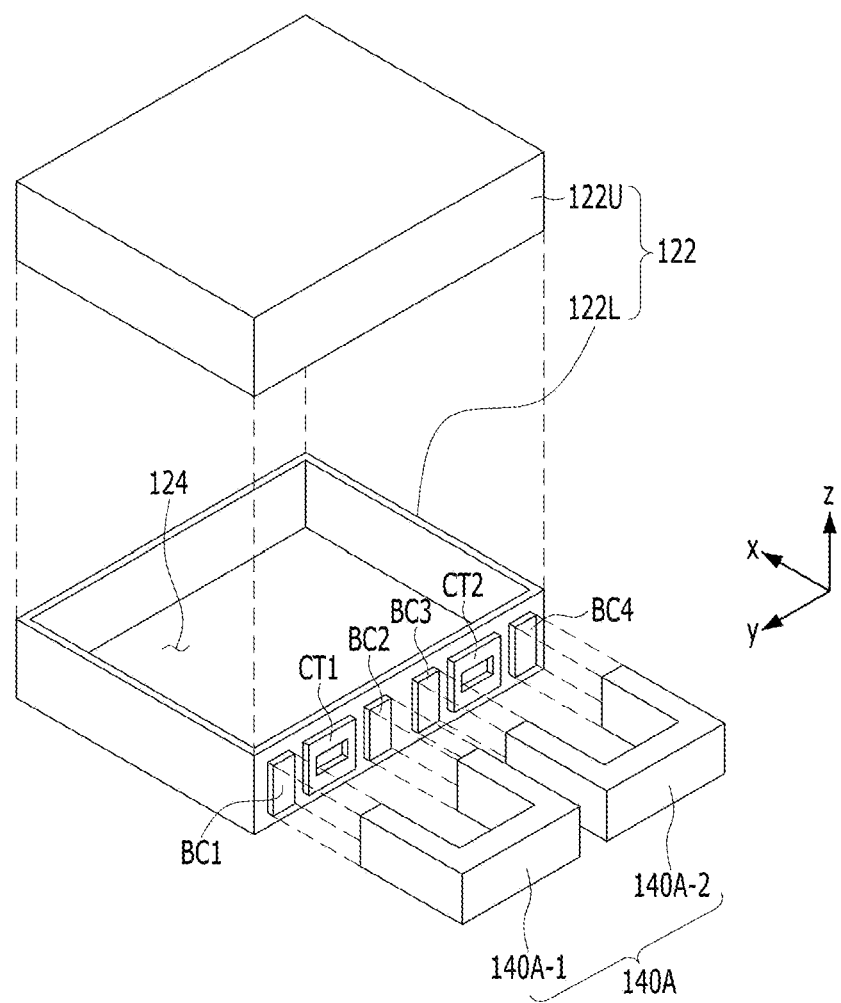
FIG. 6A is an exploded perspective view of embodiments of a power distributor and a cable bumper.
Figure 6B:
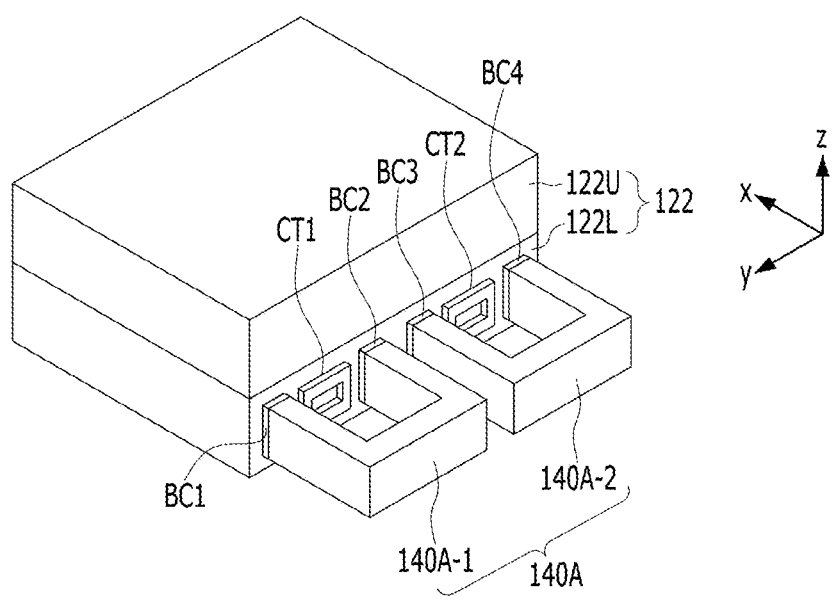
FIG. 6B is a coupled perspective view of embodiments of the power distributor and the cable bumper shown in FIG. 6A.
Figure 6C:
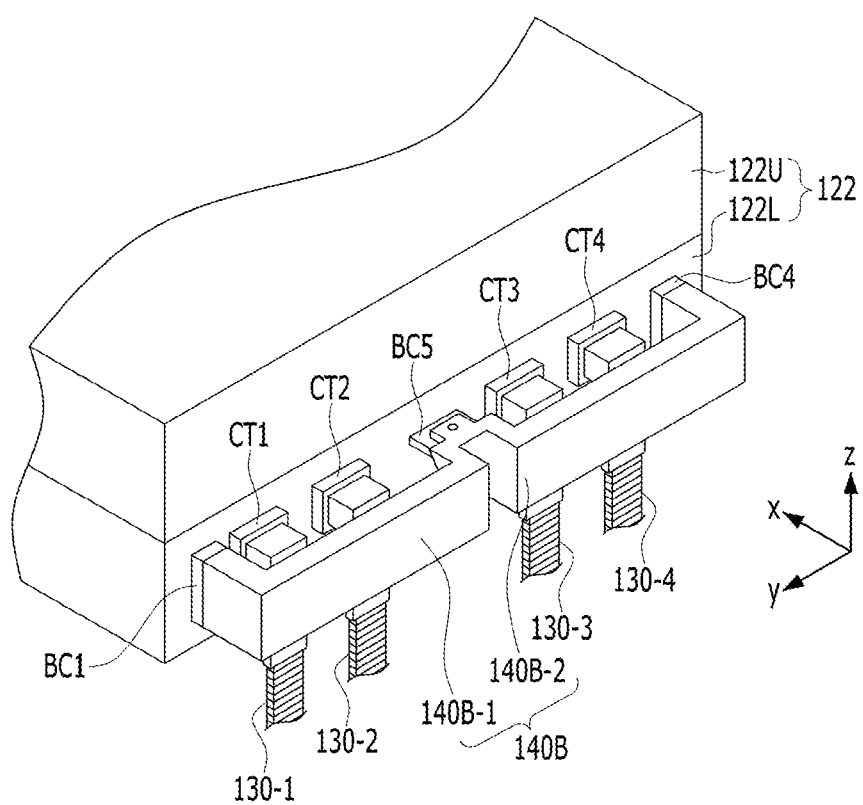
FIG. 6C is a coupled perspective view of other embodiments of the power distributor, a voltage cable, and the cable bumper.

FIG. 6A is an exploded perspective view of embodiments of the power distributor 120 and the cable bumper 140, FIG. 6B is a coupled perspective view of the embodiments of the power distributor 120 and the cable bumper 140 shown in FIG. 6A, and FIG. 6C is a coupled perspective view of other embodiments of the power distributor 120, the voltage cable 130, and the cable bumper 140.

For convenience of description, illustration of the voltage cable 130 is omitted from FIGS. 6A and 6B. However, the voltage cable 130 may be connected to the power distributor 120 shown in FIGS. 6A and 6B in the same manner as the voltage cables 130-1 to 130-4 shown in FIG. 6C. In the case shown in FIG. 6C, four voltage cables 130 (130-1 to 130-4) may be connected to the power distributor 120. However, in the case shown in FIGS. 6A and 6B, two voltage cables 130 may be connected to the power distributor 120.

The power distributor 120 may include a housing 122, an accommodation space 124, a cable terminal, and a box-coupling portion.

The housing 122 defines the accommodating space 124, in which the first and second switching units 126 and 128 shown in FIG. 5 are disposed, and protects the parts (e.g., F1, F2, S1, and S2) included in the power distributor 120 from the external environment.

For example, the housing 122 may be divided into a lower portion 122L and an upper portion 122U, which are capable of being coupled to or separated from each other in the third direction. The parts F1, F2, S1, and S2 may be disposed inside the lower portion 122L, and the cable terminal and the box-coupling portion may be disposed at the rear side of the lower portion 122L so as to be exposed therefrom. In the case shown in FIGS. 6A and 6B, two cable terminals CT1 and CT2 and four box-coupling portions BC1, BC2, BC3, and BC4 may be exposed from the rear side of the lower portion 122L. In the case shown in FIG. 6C, four cable terminals CT1, CT2, CT3, and CT4 and three box-coupling portions BC1, BC4, and BC5 may be exposed from the rear side of the lower portion 122L.

For example, referring to FIG. 6C, the cable terminals CT1, CT2, CT3, and CT4 may be disposed at the housing 122, e.g., the rear side of the lower portion 122L, and may be connected to the voltage cables 130-1 to 130-4. The cable terminals may be provided in the same number as the voltage cables.

Although it is illustrated in FIGS. 6A to 6C that a plurality of cable terminals and a plurality of voltage cables are provided, a single cable terminal and a single voltage cable may be provided.

The power generated by the fuel cell 110 may be provided to a load of the fuel cell vehicle 100 through the cable terminals CT1, CT2, CT3, and CT4 of the power distributor 120 and the voltage cables 130-1 to 130-4.

The box-coupling portions are disposed at the rear side of the lower portion 122L, and are coupled to the cable bumper 140. To this end, the box-coupling portions may include first to $N^{th}$ box-coupling portions, which are disposed at the rear side of the housing 122 (e.g., the lower portion 122L) so as to be spaced apart from each other in the second direction, which intersects the first direction, which is parallel to the direction in which the fuel cell vehicle 100 travels. Here, "N" is a positive integer of 2 or greater. "N" may be four, as shown in FIGS. 6A and 6B, or may be three, as shown in FIG. 6C.

The cable bumper may include first to N$^{th}$ bumper-coupling portions, which are respectively coupled to the first to N$^{th}$ box-coupling portions. Here, the number of first to N$^{th}$ box-coupling portions and the number of first to N$^{th}$ bumper-coupling portions may be the same as each other. That is, in the case shown in FIGS. 6A and 6B, each of the number of box-coupling portions and the number of bumper-coupling portions may be four, and in the case shown in FIG. 6C, each of the number of box-coupling portions and the number of bumper-coupling portions may be three.

The bumper-coupling portions may correspond to respective end portions of the second, third, and fourth parts P2, P3, and P4 shown in FIGS. 9A and 9B, which will be described later.

According to an embodiment, at least one cable terminal may be located between the first to N$^{th}$ box-coupling portions.

For example, in the case shown in FIGS. 6A and 6B, two cable terminals CT1 and CT2 may be located between the first to fourth box-coupling portions BC1 to BC4. Specifically, the first cable terminal CT1 may be located between the first and second box-coupling portions BC1 and BC2, and the second cable terminal CT2 may be located between the third and fourth box-coupling portions BC3 and BC4.

Alternatively, in the case shown in FIG. 6C, four cable terminals CT1 to CT4 may be located between the first, fourth, and fifth box-coupling portions BC1, BC4, and BC5. Specifically, the first and second cable terminals CT1 and CT2 may be located between the first and fifth box-coupling portions BC1 and BC5, and the third and fourth cable terminals CT3 and CT4 may be located between the fifth and fourth box-coupling portions BC5 and BC4.

The box-coupling portion and the bumper-coupling portion may be coupled to each other in various forms. The embodiments are not limited as to the specific form in which the box-coupling portion and the bumper-coupling portion are coupled to each other.

Figure 7:
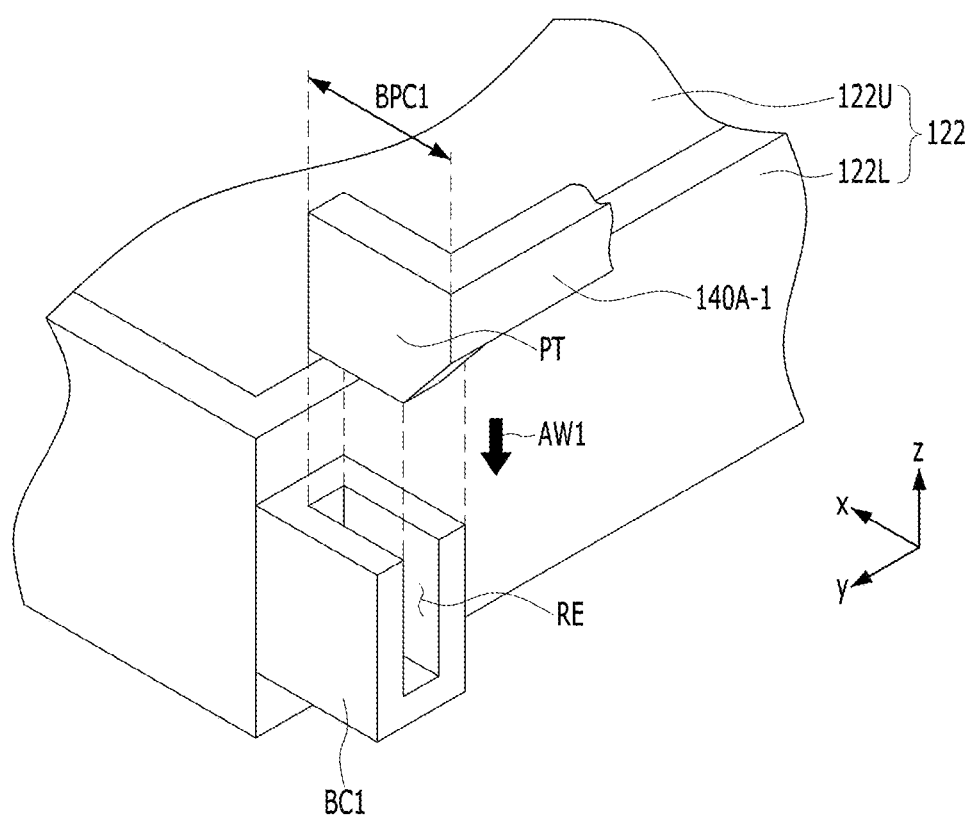
FIG. 7 is a partially exploded perspective view of embodiments of the housing and the cable bumper shown in FIGS. 6A and 6B.

FIG. 7 is a partially exploded perspective view of embodiments of the housing 122 and the cable bumper 140A-1 shown in FIGS. 6A and 6B.

According to an embodiment, one of the n$^{th}$ box-coupling portion and the n$^{th}$ bumper-coupling portion may include a protruding portion, which protrudes in the first direction, and the other one thereof may include a recessed portion, in which the protruding portion is received. Here, $1 \le n \le N$.

For example, referring to FIG. 7, among the first box-coupling portion BC1 and the first bumper-coupling portion BPC1, the first bumper-coupling portion BPC1 may include a protruding portion PT, which protrudes in the first direction, and the first box-coupling portion BC1 may include a recessed portion RE, in which the protruding portion PT is received. Alternatively, opposite what is shown in FIG. 7, among the first box-coupling portion BC1 and the first bumper-coupling portion BPC1, the first box-coupling portion BC1 may include a protruding portion PT, which protrudes in the first direction, and the first bumper-coupling portion BPC1 may include a recessed portion RE, in which the protruding portion PT is received. In this case, the protruding portion PT may be inserted into and coupled into the recessed portion RE in the third direction, indicated by the arrow AW1, which intersects the first and second directions. The box-coupling portions BC2, BC3, and BC4 and the bumper-coupling portions shown in FIGS. 6A to 6C may also be coupled to each other in the coupling manner using the protruding portion PT and the recessed portion RE shown in FIG. 7.

Figure 8A:
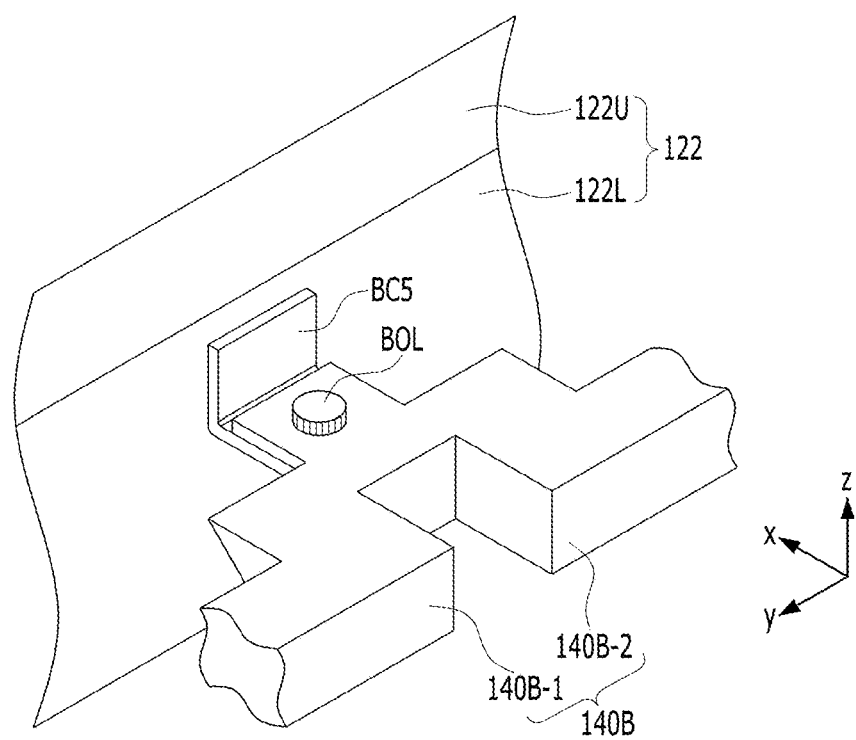
FIGS. 8A and 8B are, respectively, a coupled perspective view and an exploded perspective view of embodiments of the housing and the cable bumper shown in FIG. 6C.
Figure 8B:
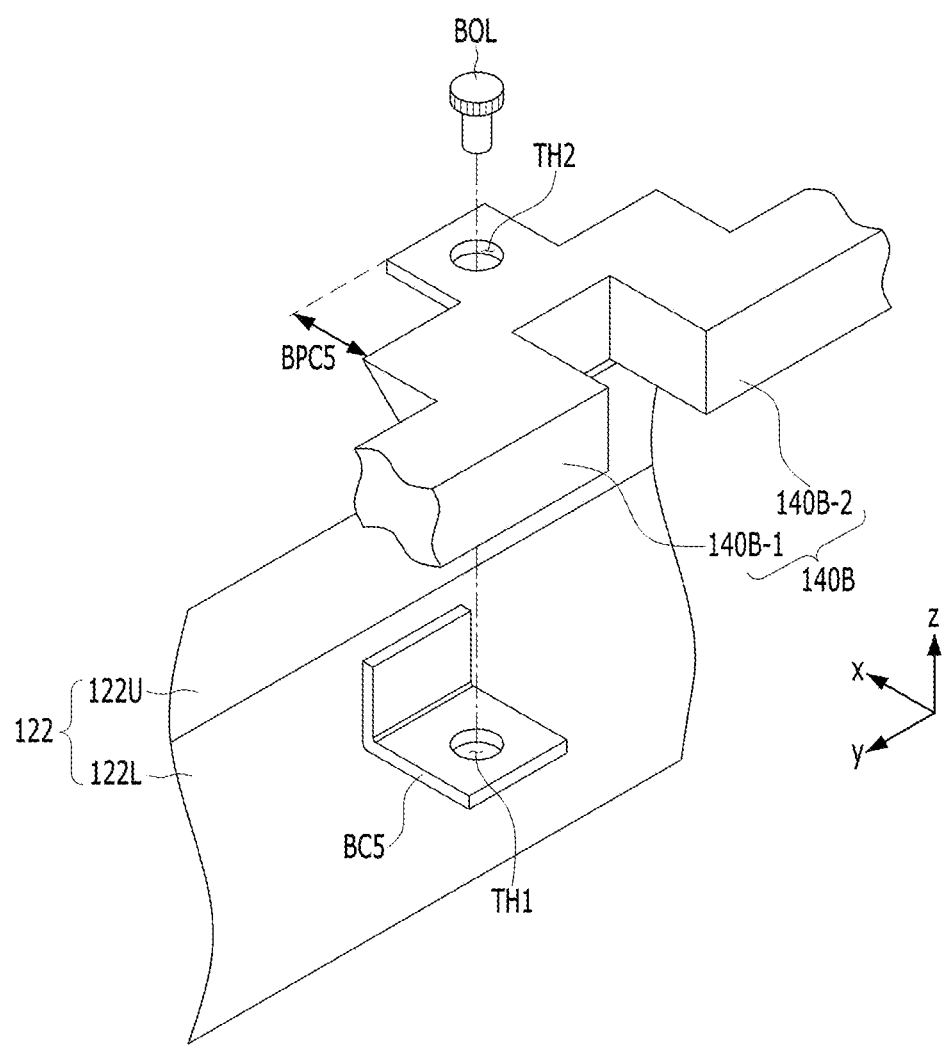

FIGS. 8A and 8B are, respectively, a coupled perspective view and an exploded perspective view of embodiments of the housing 122 and the cable bumper 140B shown in FIG. 6C.

According to another embodiment, the n$^{th}$ box-coupling portion protrudes in the first direction toward the cable bumper, and includes a first through-hole formed therethrough in the third direction. The n$^{th}$ bumper-coupling portion protrudes so as to overlap the n$^{th}$ box-coupling portion in the third direction, and includes a second through-hole formed therethrough in the third direction. In this case, the n$^{th}$ box-coupling portion and the n$^{th}$ bumper-coupling portion may be coupled to each other by inserting a fastening member into the first and second through-holes in the third direction.

For example, referring to FIGS. 8A and 8B, the fifth box-coupling portion BT5 protrudes in the first direction toward the fifth cable bumper 140B, and includes a first through-hole TH1 formed therethrough in the third direction. The fifth bumper-coupling portion BPC5 protrudes so as to overlap the fifth box-coupling portion BC5 in the third direction, and includes a second through-hole TH2 formed therethrough in the third direction. In this case, the fifth box-coupling portion BC5 and the fifth bumper-coupling portion BPC5 may be coupled to each other by inserting a fastening member, e.g., a bolt BOL, into the first and second through-holes TH1 and TH2 in the third direction.

According to an embodiment, the cable bumper may include a plurality of cable bumpers disposed adjacent to each other in the second direction, and each of the plurality of cable bumpers may include first and second bumper-coupling portions located at respective ends thereof in the second direction. For example, as shown in FIGS. 6A and 6B, the cable bumper 140A may include a plurality of cable bumpers 140A-1 and 140A-2 disposed adjacent to each other in the second direction, and each of the plurality of cable bumpers 140A-1 and 140A-2 may include first and second bumper-coupling portions located at respective ends thereof in the second direction. Referring to FIG. 9A, which will be described later, the end portion of the second portion P2 may correspond to the first bumper-coupling portion, and the end portion of the third portion P3 may correspond to the second bumper-coupling portion. Also, referring to FIG. 7, the first cable bumper 140A-1 may include a first bumper-coupling portion BPC1, located at one of the two end portions thereof in the second direction.

According to another embodiment, as shown in FIG. 6C, a single cable bumper 140B (140B-1 and 140B-2) may be provided. That is, as shown in FIG. 6C, the first and second cable bumpers 140B-1 and 140B-2 may be integrated.

Hereinafter, portions of the cable bumpers 140A and 140B will be described with reference to the accompanying drawings.

Figure 9A:
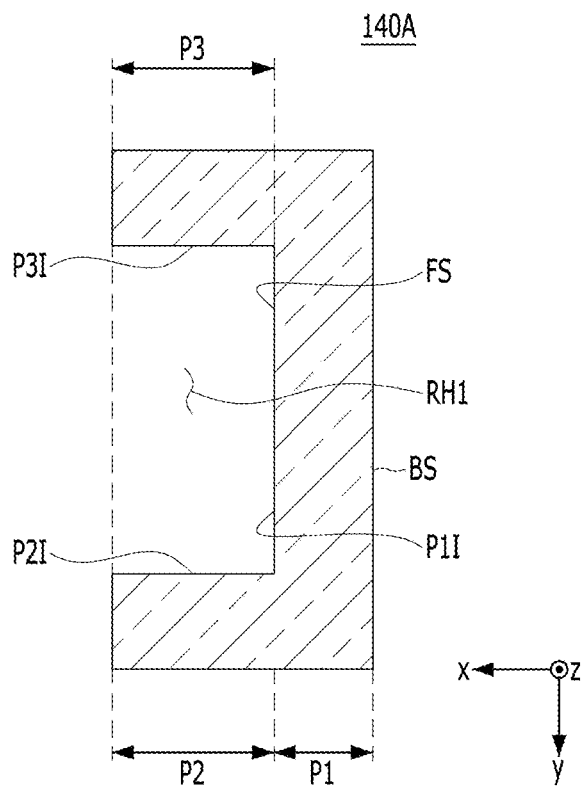
FIG. 9A is a plan view of the cable bumper shown in FIGS. 6A, 6B, and 7.

FIG. 9A is a plan view of the cable bumper 140A shown in FIGS. 6A, 6B, and 7, and FIG. 9B is a plan view of the cable bumper 140B shown in FIGS. 6C, 8A, and 8B.

The plan view of the cable bumper 140A shown in FIG. 9A may correspond to a plan view of each of the first and second cable bumpers 140A-1 and 140A-2 shown in FIGS. 6A and 6B. According to an embodiment, the cable bumper 140A shown in FIG. 9A may include first, second, and third portions P1, P2, and P3.

The first portion P1 may be formed in the shape of a bar extending in the second direction. In this case, the first portion P1 may include a front surface FS facing the power distributor 120 in the first direction and a rear surface BS formed opposite the front surface FS.

The second portion P2 protrudes from one of the two end portions of the front surface FS of the first portion P1 in the first direction toward the rear side of the power distributor 120. The end portion of the second portion P2 corresponds to the bumper-coupling portion that is coupled to one (e.g., BC1 or BC3) of the first to $N^{th}$ box-coupling portions.

The third portion P3 protrudes from the other of the two end portions of the front surface FS of the first portion P1 in the first direction toward the rear side of the power distributor 120. The end portion of the third portion P3 corresponds to the bumper-coupling portion that is coupled to another one (e.g., BC2 or BC4) of the first to $N^{th}$ box-coupling portions.

The inner surface P1I of the first portion P1, the inner surface P2I of the second portion P2, and the inner surface P3I of the third portion P3 may define a first receiving hole RH1, which surrounds at least a portion of the voltage cable 130.

Figure 9B:
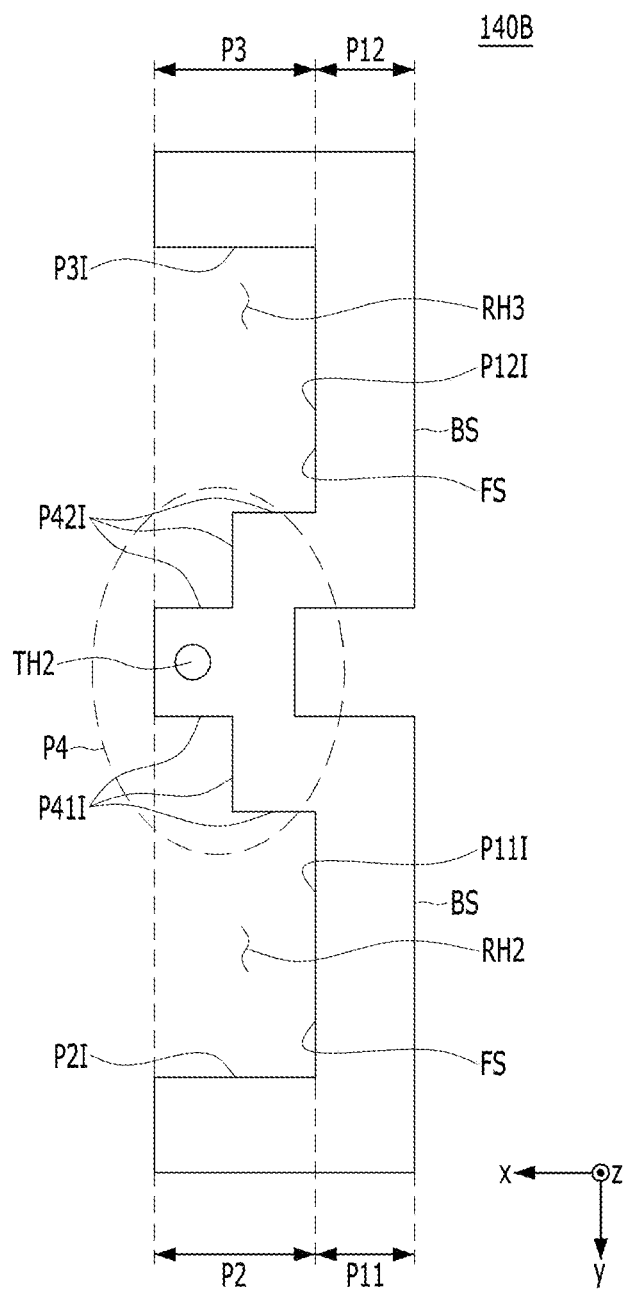
FIG. 9B is a plan view of the cable bumper shown in FIGS. 6C, 8A, and 8B.

According to another embodiment, the cable bumper 140B shown in FIG. 9B may include first portions P11 and P12, a second portion P2, a third portion P3, and a fourth portion P4.

The first portions P11 and P12 may be formed in the shape of a bar extending in the second direction. In this case, the first portions P11 and P12 may include a front surface FS facing the power distributor 120 in the first direction and a rear surface BS formed opposite the front surface FS.

The second portion P2 protrudes from one of the two end portions of the front surface FS of the first portions P11 and P12 in the first direction toward the rear side of the power distributor 120. The end portion of the second portion P2 corresponds to the bumper-coupling portion that is coupled to one (e.g., BC1) of the first to $N^{th}$ box-coupling portions.

The third portion P3 protrudes from the other one of the two end portions of the front surface FS of the first portions P11 and P12 in the first direction toward the rear side of the power distributor 120. The end portion of the third portion P3 corresponds to the bumper-coupling portion that is coupled to another one (e.g., BC4) of the first to $N^{th}$ box-coupling portions.

The fourth portion P4 protrudes from the middle portion between the two end portions of the front surface FS of the first portions P11 and P12 in the first direction toward the rear side of the power distributor 120. The end portion of the fourth portion P4 corresponds to the bumper-coupling portion that is coupled to still another one (e.g., BC5) of the first to $N^{th}$ box-coupling portions.

The inner surface P11I of the first portion P11, the inner surface P2I of the second portion P2, and the inner surface P41I of the fourth portion P4 may define a second receiving hole RH2, which surrounds at least a portion of the voltage cable (e.g., 130-1 and 130-2). The inner surface P12I of the first portion P12, the inner surface P3I of the third portion P3, and the inner surface P42I of the fourth portion P4 may define a third receiving hole RH3, which receives at least a portion of the voltage cable (e.g., 130-3 and 130-4).

As shown in FIGS. 9A and 9B, the cable bumpers 140A and 140B may be implemented in the form of a kind of bumper-type guide bar, and thus the first to third receiving holes RH1, RH2, and RH3 may absorb external shocks in the event that the fuel cell vehicle 100 is in a collision.

Figure 10:
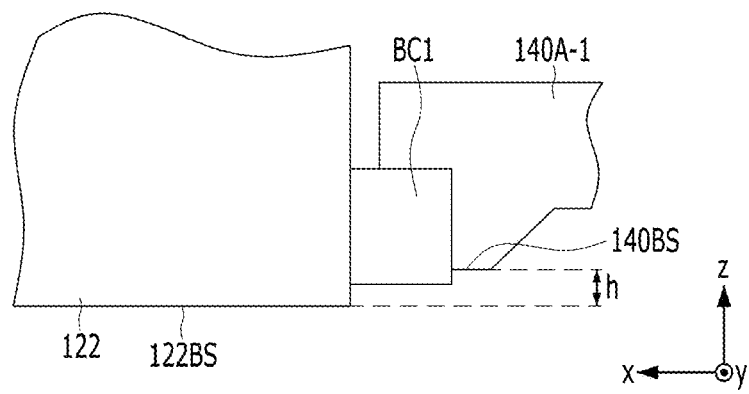
FIG. 10 is a side view of the fuel cell vehicle shown in FIGS. 6A, 6B, and 7.

FIG. 10 is a side view of the fuel cell vehicle shown in FIGS. 6A, 6B, and 7.

According to an embodiment, the first lower (or, bottom) surface of the cable bumper 140 may be located at a higher position than, or at the same height as, the second lower (or, bottom) surface of the housing 122 from the ground. For example, referring to FIG. 10, the first lower surface 140BS of the cable bumper 140A-1 may be located at a position that is higher by a designated height h than the second lower surface 122BS of the housing 122 from the ground.

Figure 11A:
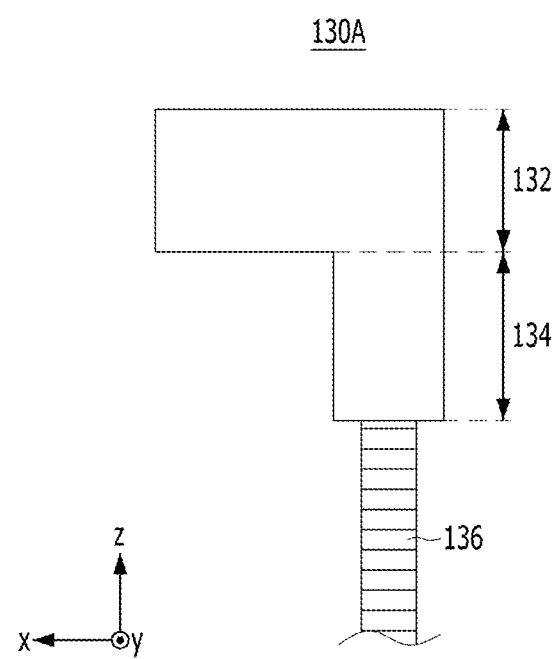
FIGS. 11A and 11B are side views of embodiments of the voltage cable.
Figure 11B:
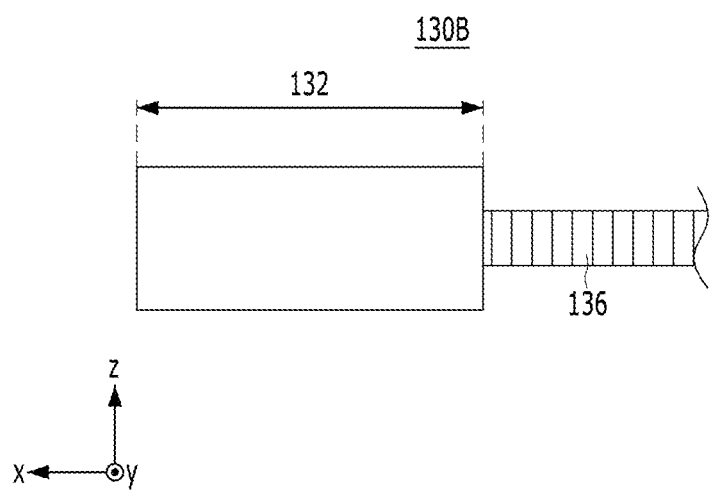

FIG. 11A is a side view of an embodiment 130A of the voltage cable 130, and FIG. 11B is a side view of another embodiment 130B of the voltage cable 130.

According to an embodiment, as shown in FIG. 11A, the voltage cable 130A may include a connection portion 132 and an extension portion 134. The connection portion 132 is connected to the cable terminals (CT1 and CT2 shown in FIGS. 6A and 6B or CT1, CT2, CT3, and CT4 shown in FIG. 6C). The extension portion 134 is bent and extends from the connection portion 132 in the third direction, which intersects the first and second directions. In addition, the voltage cable 130A may further include a lead wire 136, which connects the extension portion 134 to a load (not shown) of the fuel cell vehicle 100.

According to another embodiment, as shown in FIG. 11B, the voltage cable 130B may include the connection portion 132, but may not include the extension portion 134. In addition, the voltage cable 130B may further include a lead wire 136, which connects the connection portion 132 to a load (not shown) of the fuel cell vehicle 100.

The connection portion 132 may be received in the above-described first, second, or third receiving hole RH1, RH2, or RH3, and at least a portion of the extension portion 134 may be received in the first, second, or third receiving hole RH1, RH2, or RH3.

The cable bumper according to an embodiment may include at least one of a shock-absorbing member or a shock-dispersing member.

Hereinafter, the shock-absorbing member and the shock-dispersing member included in the cable bumper according to the embodiments will be described with reference to the accompanying drawings. Although the cable bumper 140A shown in FIG. 9A will be described below, the following description may also apply to the case in which the cable bumper 140 has the shape shown in FIG. 9B. That is, when the following description is applied to the cable bumper 140A shown in FIG. 9B, the first portion P1, the second portion P2, and the third portion P3, which will be mentioned below, respectively correspond to the first portions P11 and P12, the second portion P2, and the third portion P3 shown in FIG. 9B.

FIGS. 12A to 12D are plan views of embodiments of the cable bumper 140A including various types of shock-absorbing members.

The cable bumper 140A may include a shock-absorbing member, which is disposed in at least one of the first portion P1, the second portion P2, or the third portion P3.

Figure 12A:
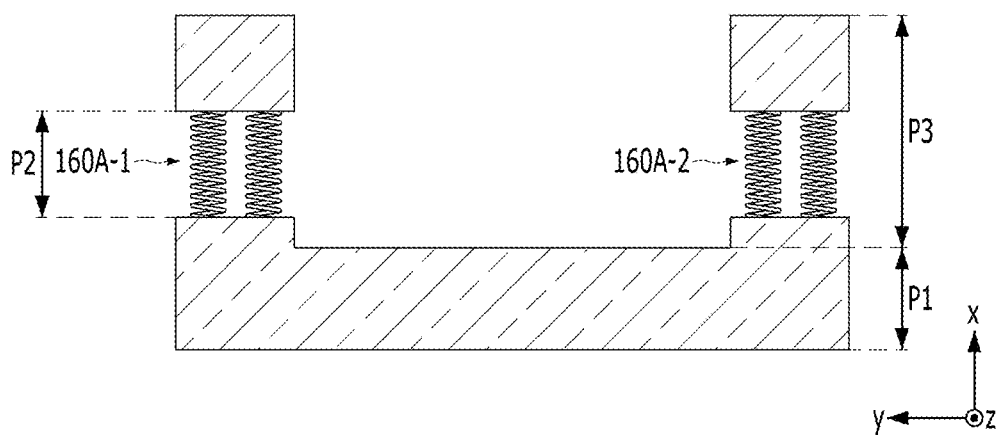
FIGS. 12A to 12D are plan views of embodiments of the cable bumper including various types of shock-absorbing members.

According to an embodiment, as shown in FIG. 12A, the cable bumper 140A may include first and second shock-absorbing members 160A-1 and 160A-2. The first shock-absorbing member 160A-1 may be disposed in the second portion P2, and the second shock-absorbing member 160A-2 may be disposed in the third portion P3. In this case, the first and second shock-absorbing members 160A-1 and 160A-2 may have planar shapes that are symmetrical to each other in the second direction.

Figure 12B:
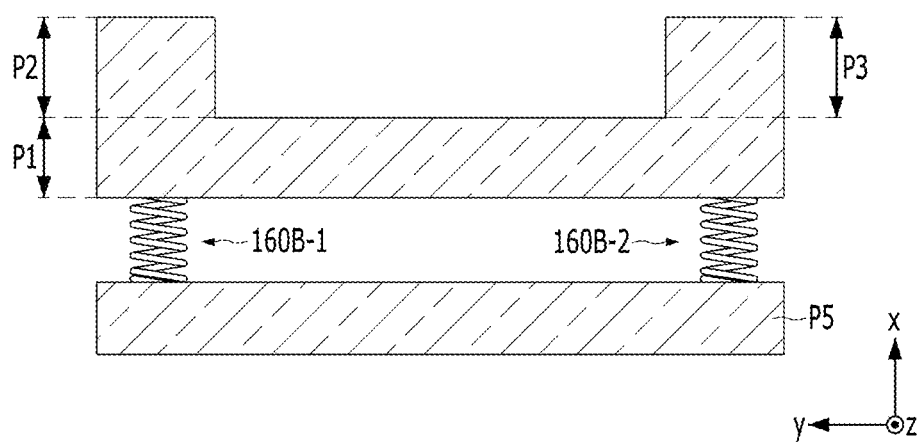

According to another embodiment, as shown in FIG. 12B, the cable bumper 140A may include third and fourth shock-absorbing members 160B-1 and 160B-2. In this case, the cable bumper 140A may further include a fifth portion P5, which is spaced apart from the first portion P1 in the first direction, unlike what is shown in FIG. 9A.

The third shock-absorbing member 160B-1 may be disposed at a position that is aligned to be overlapped with the second portion P2 in the first direction in the space between the first portion P1 and the fifth portion P5. The fourth shock-absorbing member 160B-2 may be disposed at a position that is aligned to be overlapped with the third portion P3 in the first direction in the space between the first portion P1 and the fifth portion P5. In this case, the third and fourth shock-absorbing members 160B-1 and 160B-2 may have planar shapes that are symmetrical to each other in the second direction.

Figure 12C:
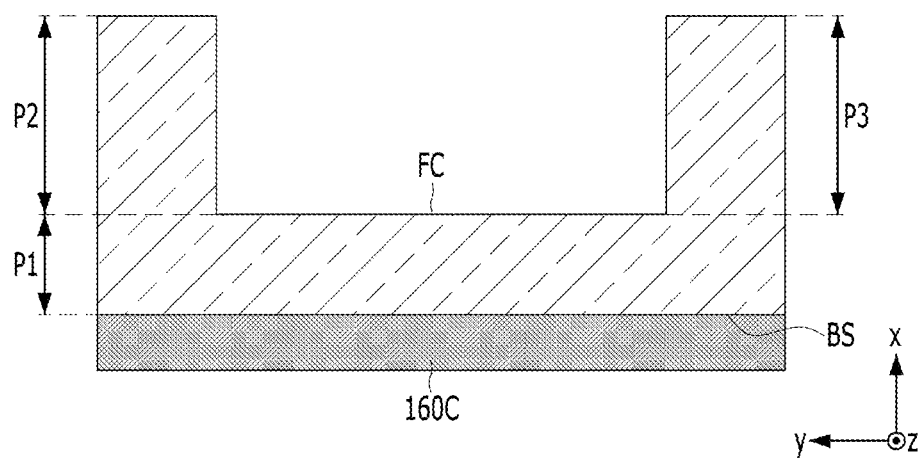
Figure 12D:
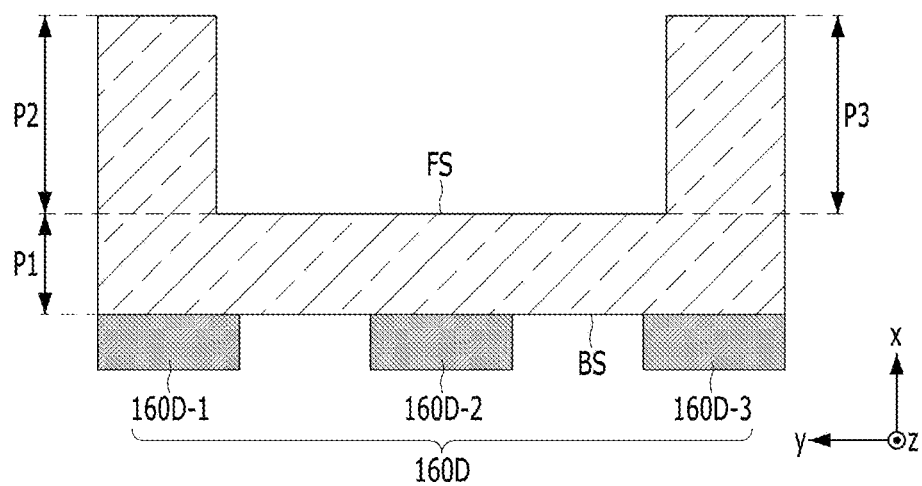

According to still another embodiment, as shown in FIG. 12C or 12D, the cable bumper 140A may include a fifth shock-absorbing member 160C or 160D. The fifth shock-absorbing member 160C or 160D may be disposed on the rear surface BS of the first portion P1, which is formed opposite the front surface FS. In this case, the fifth shock-absorbing member 160D may include a plurality of shock-absorbing members 160D-1, 160D-2, and 160D-3 disposed so as to be spaced apart from each other in the second direction.

In order to realize the above operation, the shock-absorbing member may be implemented as a spring, as shown in FIGS. 12A and 12B, or may be implemented as an elastic member, such as rubber or silicone, as shown in FIGS. 12C and 12D.

FIGS. 13A to 13D are plan views of embodiments of the cable bumper 140A including various types of shock-dispersing members.

According to an embodiment, the cable bumper 140A may have a first rigidity, and may include a shock-dispersing member having a second rigidity, which is lower than the first rigidity. The shock-dispersing member may be disposed in at least one of the first portion P1, the second portion P2, or the third portion P3. That is, at least one of the first portion P1, the second portion P2, or the third portion P3 may include a shock-dispersing member. For example, the cable bumper 140A may be made of aluminum or steel so as to have the first rigidity, and the shock-dispersing member may be made of metal, plastic, or a combination thereof, which has a second rigidity much lower than the first rigidity.

Figure 13A:
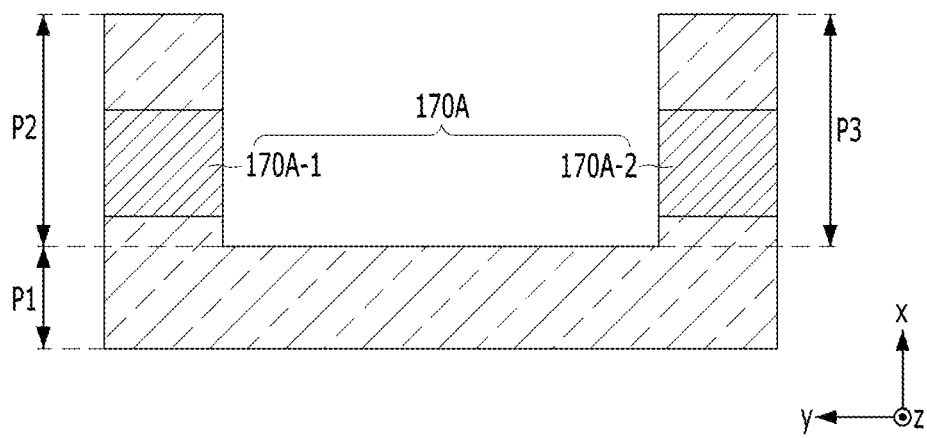
FIGS. 13A to 13D are plan views of embodiments of the cable bumper including various types of shock-dispersing members.

According to an embodiment, as shown in FIG. 13A, the cable bumper 140A may include first and second shock-dispersing members 170A (170A-1 and 170A-2). The first shock-dispersing member 170A-1 may be disposed in the second portion P2, and the second shock-dispersing member 170A-2 may be disposed in the third portion P3. The first and second shock-dispersing members 170A-1 and 170A-2 may have planar shapes that are symmetrical to each other in the second direction.

Figure 13B:
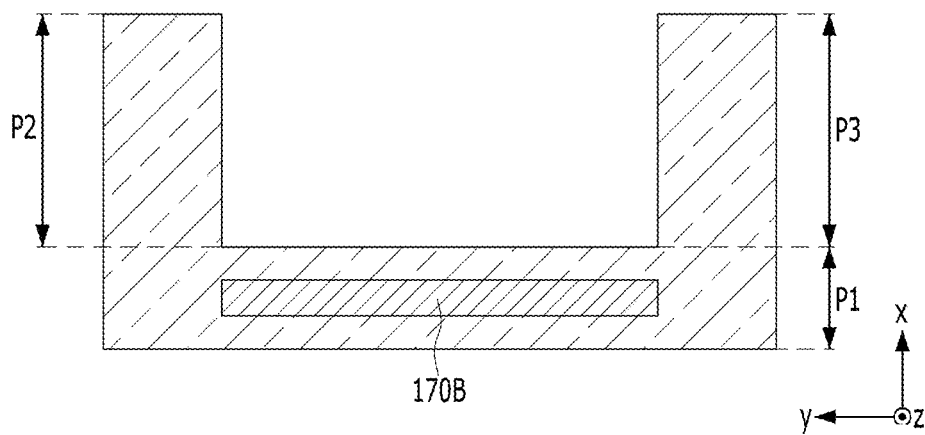

According to another embodiment, as shown in FIG. 13B, the cable bumper 140A may include a third shock-dispersing member 170B, which is embedded in the first portion P1.

Figure 13C:
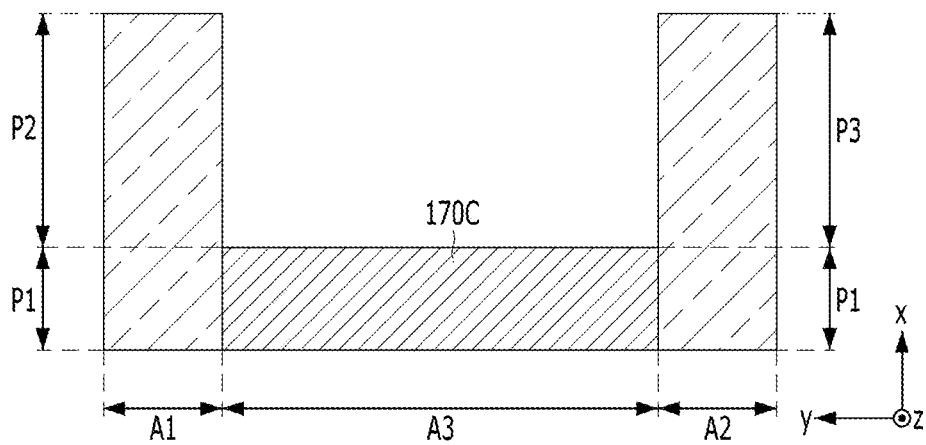
Figure 13D:
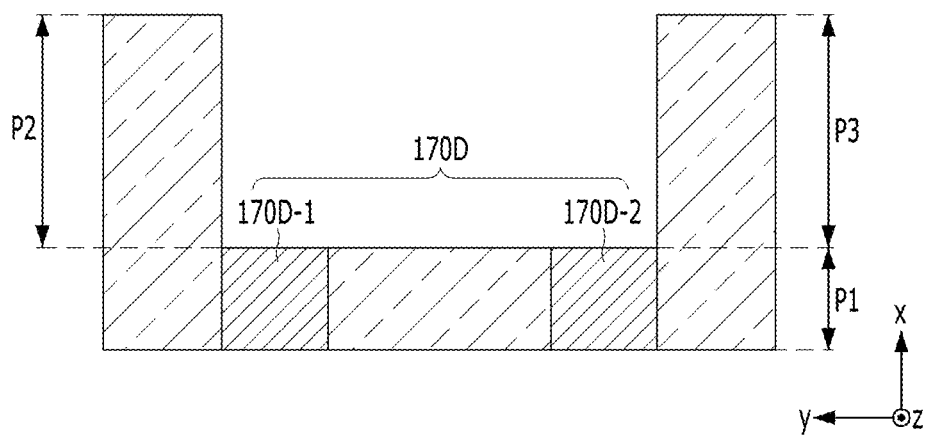

According to still another embodiment, as shown in FIG. 13C or 13D, the cable bumper 140A may include a fourth or fifth shock-dispersing member 170C or 170D, which is disposed in the first portion P1.

The first portion P1 may include first, second, and third areas A1, A2, and A3. The first area A1 is an area that is overlapped with the second portion P2 in the first direction, the second area A2 is an area that is overlapped with the third portion P3 in the first direction, and the third area A3 is the area formed between the first area A1 and the second area A2. In this case, as shown in FIG. 13C, the fourth shock-dispersing member 170C may be disposed in the entirety of the third area A3, and as shown in FIG. 13D, the fifth shock-dispersing member 170D may be disposed around the middle portion of the third area A3, rather than being disposed in the middle portion of the third area A3.

In addition, although not shown, the cable bumper 140 (140A or 140B) according to an embodiment may include both the shock-absorbing member and the shock-dispersing member. In this case, the cable bumper 140 (140A or 140B) according to an embodiment may be configured such that the shock-absorbing members shown in FIGS. 12A to 12D and the shock-dispersing members shown in FIGS. 13A to 13D are combined in various manners.

Hereinafter, a method of manufacturing the fuel cell vehicle 100 according to an embodiment will be described with reference to the accompanying drawings. The following description relates to a method of manufacturing the fuel cell vehicle 100 shown in FIGS. 6A and 6B. However, the following description may also apply to a method of manufacturing the fuel cell vehicle 100 shown in FIG. 6C.

FIGS. 14A to 14D are perspective views for explaining processes of a method of manufacturing the fuel cell vehicle 100 according to an embodiment. Here, the same parts as those of the fuel cell vehicle 100 according to the embodiments described above are denoted by the same reference numerals, and duplicate descriptions thereof will be omitted.

Figure 14A:
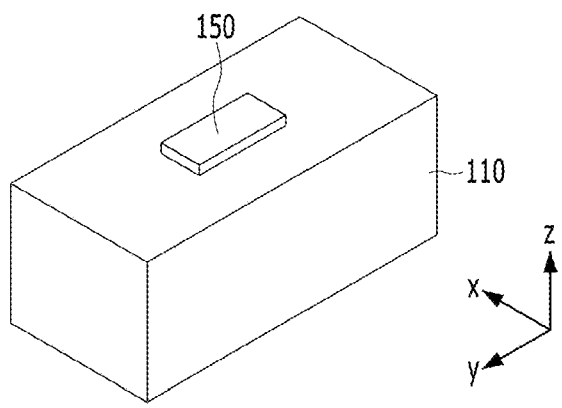
FIGS. 14A to 14D are perspective views for explaining processes of a method of manufacturing the fuel cell vehicle according to an embodiment.

Referring to FIG. 14A, a fuel cell 110, on which a terminal block 150 is disposed, is prepared.

Figure 14B:
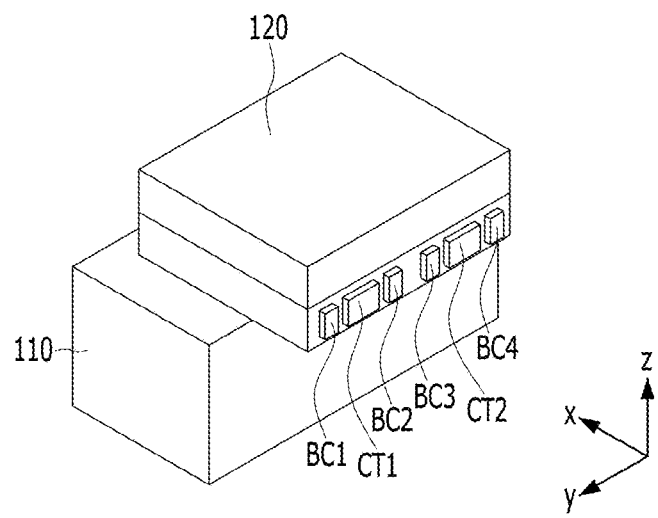

Thereafter, as shown in FIG. 14B, a power distributor 120 is installed on the fuel cell 110 so as to be electrically connected to the terminal block 150.

Figure 14C:
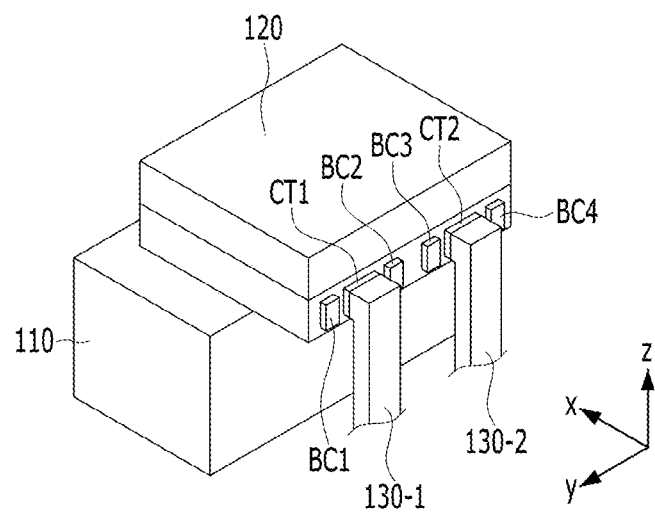

Thereafter, as shown in FIG. 14C, voltage cables 130-1 and 130-2 are connected to cable terminals CT1 and CT2 of the power distributor 120.

Figure 14D:
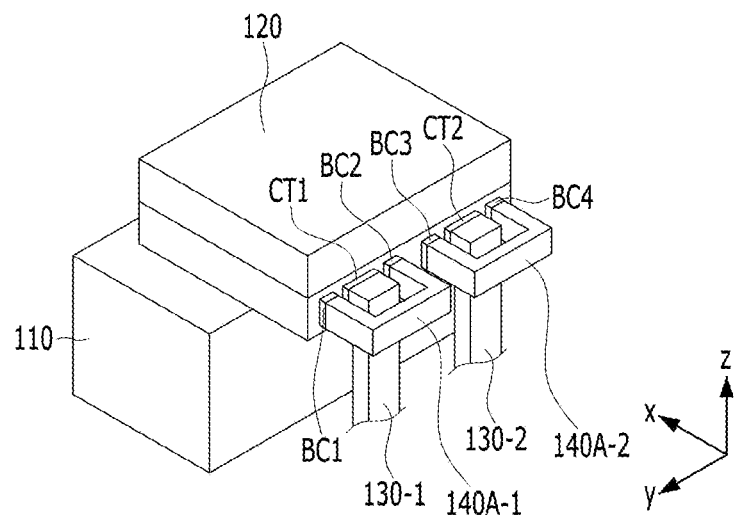

Thereafter, as shown in FIG. 14D, cable bumpers 140A-1 and 140A-2 are coupled to box-coupling portions BC1, BC2, BC3, and BC4, which are exposed from the rear side of the power distributor 120, so as to surround the voltage cables 130-1 and 130-2.

Hereinafter, a fuel cell vehicle according to a comparative example and the fuel cell vehicle according to an embodiment will be described with reference to the accompanying drawings.

A fuel cell vehicle according to a comparative example does not include the cable bumper 140.

Figure 15:
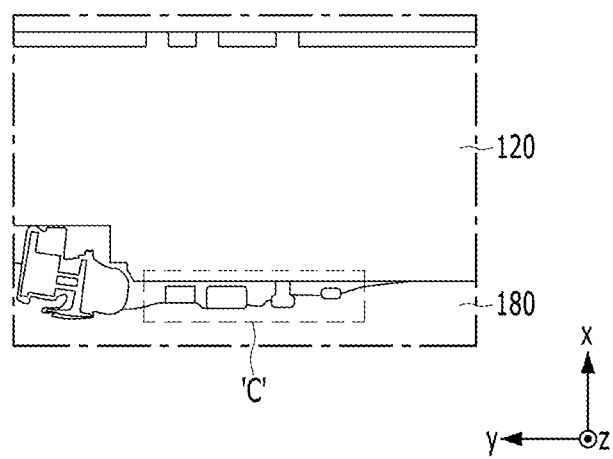
FIG. 15 is a plan view showing the state in which the fuel cell vehicle is impacted in a first direction.
Figure 16A:
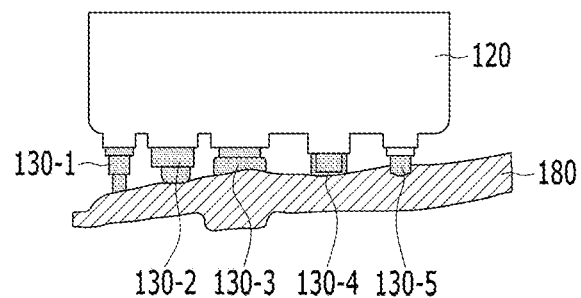
FIGS. 16A to 16D are enlarged plan views of portion "C" in FIG. 15.
Figure 16B:
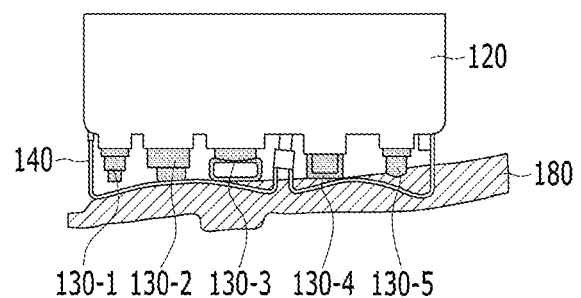
Figure 16C:
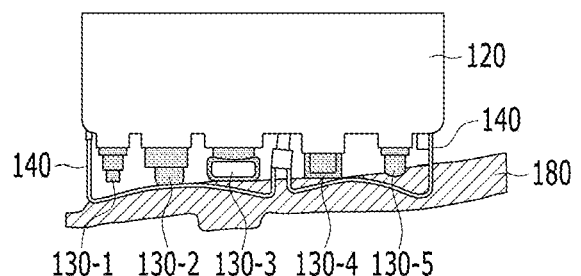
Figure 16D:
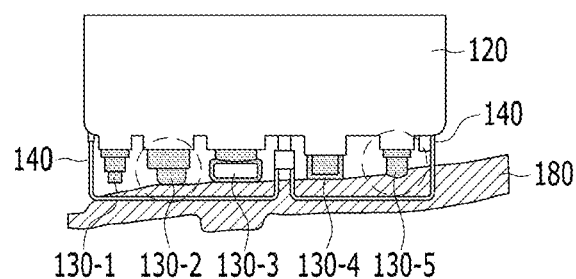

FIG. 15 is a plan view showing the state in which the fuel cell vehicle is impacted in the first direction, and FIGS. 16A to 16D are enlarged plan views of portion "C" in FIG. 15. For convenience of description, only the power distributor 120, the voltage cable 130, the cable bumper 140, and the dash panel 180 are shown in FIGS. 15 to 16D.

As shown in FIG. 16A, the fuel cell vehicle according to the comparative example does not include the cable bumper 140. Therefore, when the fuel cell vehicle is impacted in the first direction, the voltage cables 130-1 to 130-5 may come into contact with the dash panel 180, and may thus be damaged or caught between the dash panel 180 and the power distributor 120. In this case, when the voltage cables 130-1 to 130-5 are damaged, leakage current having a high intensity may flow through the body of the fuel cell vehicle, which may electrically shock occupants in the fuel cell vehicle. Further, the fuel cell vehicle may burn, catch fire, or explode. Consequently, the safety of the occupants in the fuel cell vehicle may be threatened. In particular, as shown in FIG. 2, in the case in which the remaining portion 120P2 of the power distributor 120 protrudes beyond the end 110E of the cell stack 112 toward the dash panel 180, the distance between the voltage cables 130 (130-1 to 130-5) and the dash panel 180 decreases, and thus the above problems are more likely to occur. Further, in the event that the fuel cell vehicle is in a collision, the voltage cables 130-1 to 130-5 and the power distributor 120 may move over the dash panel 180 and directly hit the occupant.

In contrast, the fuel cell vehicle 100 according to the embodiment shown in FIGS. 16B to 16D includes the cable bumper 140. Therefore, when the fuel cell vehicle 100 is impacted in the first direction, the extent of damage to the voltage cables 130-1 to 130-5 due to contact with the dash panel 180 decreases compared to the comparative example shown in FIG. 16A. Therefore, the possibility of occupants being electrically shocked or the possibility of the fuel cell vehicle burning or catching fire due to damage to the voltage cables 130-1 to 130-5 decreases compared to the comparative example. Accordingly, it may be possible to ensure the safety of occupants in the fuel cell vehicle and to comply with high-voltage safety regulations for fuel cell vehicles.

For example, the material of the cable bumper 140 may include at least one of steel or aluminum, and the cable bumper 140 may have a thickness of 1 mm to 10 mm, for example, 3 mm or 5 mm, preferably 5 mm.

When the material of the cable bumper 140 is aluminum and the thickness of the cable bumper 140 is 5 mm, as shown in FIG. 16D, the extent of damage to the voltage cables 130-1 to 130-5 due to contact with the dash panel 180 resulting from an impact applied thereto in the first direction decreases compared to when the material of the cable bumper 140 is aluminum and the thickness of the cable bumper 140 is 3 mm, as shown in FIG. 16B. Further, when the material of the cable bumper 140 is aluminum and the thickness of the cable bumper 140 is 5 mm, as shown in FIG. 16D, the extent of damage to the voltage cables 130-1 to 130-5 due to contact with the dash panel 180 resulting from an impact applied thereto in the first direction decreases compared to when the material of the cable bumper 140 is steel and the thickness of the cable bumper 140 is 3 mm, as shown in FIG. 16C. Therefore, it may be desirable for the material of the cable bumper 140 to be aluminum and for the thickness of the cable bumper 140 to be 5 mm, but the embodiments are not limited thereto.

Further, unlike the fuel cell vehicle according to the comparative example, the fuel cell vehicle according to an embodiment includes the shock-absorbing members 160A to 160D, and thus a time to collision of the fuel cell vehicle may be shortened, and the magnitude of a shock that is applied to the voltage cables 130-1 to 130-5 may be reduced.

Figure 17:
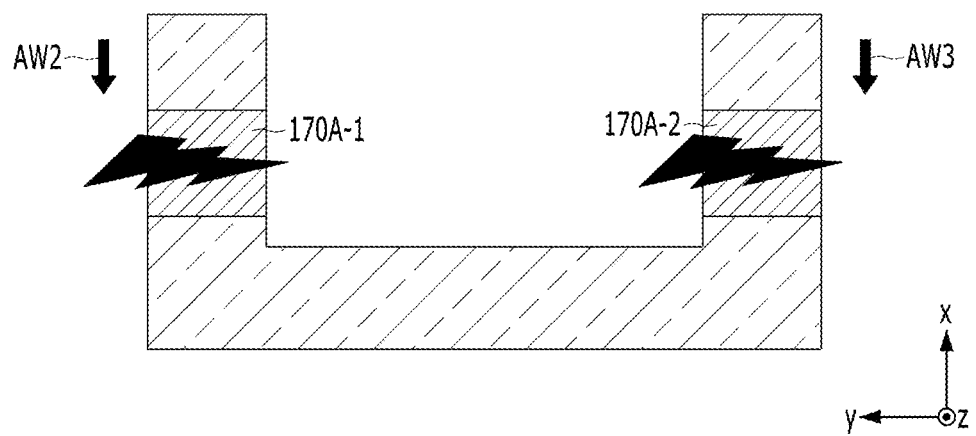
FIG. 17 is a plan view showing the state in which the fuel cell vehicle including the shock-dispersing member shown in FIG. 13A is impacted in the first direction.

FIG. 17 is a plan view showing the state in which the fuel cell vehicle 100 including the shock-dispersing member 170A shown in FIG. 13A is impacted in the first direction.

Unlike the fuel cell vehicle according to the comparative example, the fuel cell vehicle 100 according to the embodiment includes the shock-dispersing members 170A to 170D, and thus an impact applied thereto in the first direction may be dispersed by the shock-dispersing members 170A to 170D. Therefore, the possibility of the voltage cable 130 being damaged due to contact with the dash panel 180 resulting from the external impacts may further decrease. For example, referring to FIG. 17, when the fuel cell vehicle 100 is impacted in the directions indicated by the arrows AW2 and AW3, the shock-dispersing members 170A-1 and 170A-2, which have the second rigidity, lower than the first rigidity of the cable bumper 140A, fracture, thereby dispersing the impact and reducing the magnitude of the impact, thus more effectively protecting the voltage cable 130 from the external impacts.

Further, since the fuel cell vehicle according to the embodiment includes the shock-absorbing members 160A to 160D or the shock-dispersing members 170A to 170D, it may be possible to prevent or minimize damage to the voltage cable 130 in the event that the fuel cell vehicle is in a collision. Furthermore, parts (e.g., fuses and switches) included in the power distributor 120 and the cell stack 112 may be protected from external impacts resulting from a collision.

The cable bumper 140 according to the embodiments may not be required depending on the type of the fuel cell vehicle 100. For example, when the fuel cell vehicle 100 is a passenger car, as shown in FIG. 4, the cable bumper 140 may be required, but when the fuel cell vehicle 100 is a commercial vehicle (e.g., a commercial bus or a commercial truck), the cable bumper 140 may not be required. Since the cable bumper 140 is detachably coupled to the power distributor 120, a single type of housing 122 is capable of being applied to various types of fuel cell vehicles, without the need to provide various types of housings for respective types of fuel cell vehicles, thereby reducing manufacturing costs. Further, a damaged cable bumper 140 may be easily replaced.

Furthermore, owing to the first to third receiving holes RH1, RH2, and RH3 formed in the cable bumper 140 included in the fuel cell vehicle 100 according to the embodiments, the voltage cable 130A may be formed in a right-angle shape, e.g. a "¬" shape, as shown in FIG. 11A. Accordingly, it may be possible to secure a route for the voltage cable 130, which is disposed on the rear surface of the power distributor 120, and the package layout, thus increasing the spacing distance between the dash panel 180 and the voltage cable 130. As a result, it may be possible to ensure safety in the event that the fuel cell vehicle is in a collision.

Furthermore, as shown in FIG. 7, in the case in which the box-coupling portion (e.g., BC1) and the bumper-coupling portion (e.g., BPC1) are coupled to each other in a fitting manner, it may be possible to prevent movement of the box-coupling portion and the bumper-coupling portion due to vibration during travel of the fuel cell vehicle 100. Furthermore, the ease of assembly and quality of the box-coupling portion and the bumper-coupling portion may be improved.

Furthermore, according to an embodiment, as shown in FIG. 10, the first lower (or, bottom) surface 140BS of the cable bumper (e.g., 140A-1) is located at a higher position than, or at the same height as, the second lower (or, bottom) surface 122BS of the housing 122 from the ground. Accordingly, interference between the cable bumper and peripheral parts (e.g., the fuel cell 110) may be prevented or minimized.

As is apparent from the above description, according to a fuel cell vehicle of the embodiments, the possibility of occupants being electrically shocked or the possibility of the fuel cell vehicle burning or catching fire due to damage to a voltage cable may decrease. Accordingly, it may be possible to ensure the safety of occupants in the fuel cell vehicle and to comply with high-voltage safety regulations for fuel cell vehicles. In addition, a time to collision of the fuel cell vehicle may be shortened and the magnitude of a shock that is applied to the voltage cable may be reduced by a shock-absorbing member. In addition, since a shock-dispersing member fractures when an external impact is applied thereto, it may be possible to disperse the impact and to reduce the magnitude of the impact, thus more effectively protecting the voltage cable from the external impact. Since a cable bumper is detachably coupled to a power distributor, manufacturing costs may be reduced. In addition, a box-coupling portion and a bumper-coupling portion may be prevented from being moved by vibration during travel of the fuel cell vehicle, and the ease of assembly and quality of the box-coupling portion and the bumper-coupling portion may be improved.

However, the effects achievable through embodiments of the disclosure are not limited to the above-mentioned effects, and other effects not mentioned herein will be clearly understood by those skilled in the art from the above description.

The above-described various embodiments may be combined with each other without departing from the embodiments of the present disclosure unless they are incompatible with each other.

In addition, for any element that is not described in detail in any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell vehicle comprising:
a fuel cell;
a power distributor disposed on the fuel cell and configured to receive power generated by the fuel cell;
a voltage cable connected to a rear side of the power distributor; and
a cable bumper coupled to the rear side of the power distributor and surrounding a portion of the voltage cable and covering the portion of the voltage cable in a first direction in which the fuel cell vehicle travels.

2. The fuel cell vehicle according to claim 1, wherein the fuel cell comprises a cell stack configured such that a plurality of unit cells is stacked in a second direction intersecting the first direction.

3. The fuel cell vehicle according to claim 1, wherein the cable bumper is located between the rear side of the power distributor and a dash panel of the fuel cell vehicle that faces the voltage cable in the first direction.

4. The fuel cell vehicle according to claim 1, wherein the cable bumper is detachably coupled to the rear side of the power distributor.

5. A fuel cell vehicle comprising:
a fuel cell; and
a power distributor disposed on the fuel cell and configured to receive power generated by the fuel cell, the power distributor comprising:
a housing;
a cable terminal disposed at a rear side of the housing and connected to a voltage cable connected to a rear side of the power distributor; and
a box-coupling portion disposed at the rear side of the housing and coupled to a cable bumper coupled to the rear side of the power distributor and surrounding a portion of the voltage cable and covering the portion of the voltage cable in a first direction, the first direction being parallel to a direction in which the fuel cell vehicle travels.

6. The fuel cell vehicle according to claim 5, wherein:
a first lower surface of the cable bumper is located at a higher position than a second lower surface of the housing from a ground; or
the first lower surface of the cable bumper is located at a same height as the second lower surface of the housing from the ground.

7. A fuel cell vehicle comprising:
a fuel cell; and
a power distributor disposed on the fuel cell and configured to receive power generated by the fuel cell, the power distributor comprising:
a housing;
a cable terminal disposed at a rear side of the housing and connected to a voltage cable connected to a rear side of the power distributor; and
a box-coupling portion disposed at the rear side of the housing and coupled to a cable bumper coupled to the rear side of the power distributor and surrounding a portion of the voltage cable, wherein the box-coupling portion comprises first to Nth (where "N" is a positive integer of 2 or greater) box-coupling portions disposed at the rear side of the housing and spaced apart from each other in a second direction intersecting a first direction, the first direction being parallel to a direction in which the fuel cell vehicle travels, and the cable bumper comprises first to Nth bumper-coupling portions respectively coupled to the first to Nth box-coupling portions.

8. The fuel cell vehicle according to claim 7, wherein one of an nth ($1 \leq n \leq N$) box-coupling portion or an nth bumper-coupling portion coupled to the nth box-coupling portion comprises a protruding portion protruding in the first direction, and a remaining one of the nth box-coupling portion or the nth bumper-coupling portion comprises a recessed portion configured to receive the protruding portion therein.

9. The fuel cell vehicle according to claim 7, wherein the cable bumper comprises:
a first portion having a shape of a bar extending in the second direction;
a second portion protruding from one of two end portions of a front surface of the first portion in the first direction toward the rear side of the power distributor and coupled to one of the first to Nth box-coupling portions; and
a third portion protruding from a remaining one of the two end portions of the front surface of the first portion in the first direction toward the rear side of the power distributor and coupled to another one of the first to Nth box-coupling portions; and
wherein each of inner surfaces of the first portion, the second portion, and the third portion defines a first receiving hole to surround the voltage cable.

10. The fuel cell vehicle according to claim 9, wherein:
the cable bumper further comprises a fourth portion protruding from a middle portion between the two end portions of the front surface of the first portion in the first direction toward the rear side of the power distributor and coupled to a third one of the first to Nth box-coupling portions;
the inner surfaces of the first portion and the second portion and an inner surface of the fourth portion define a second receiving hole to receive a portion of the voltage cable; and
the inner surfaces of the first portion, the third portion, and the fourth portion define a third receiving hole to receive a portion of the voltage cable.

11. The fuel cell vehicle according to claim 9, wherein the voltage cable comprises:
 a connection portion connected to the cable terminal; and
 an extension portion bent and extending from the connection portion in a third direction, intersecting the first direction and the second direction; and
 wherein a portion of the extension portion and a portion of the connection portion are received in the first receiving hole.

12. The fuel cell vehicle according to claim 9, wherein the cable bumper comprises a shock-absorbing member disposed in the first portion, the second portion, or the third portion.

13. The fuel cell vehicle according to claim 12, wherein the shock-absorbing member comprises:
 a first shock-absorbing member disposed in the second portion; and
 a second shock-absorbing member disposed in the third portion.

14. The fuel cell vehicle according to claim 12, wherein:
 the cable bumper further comprises a fifth portion spaced apart from the first portion in the first direction; and
 the shock-absorbing member comprises:
  a third shock-absorbing member disposed at a position aligned to be overlapped with the second portion in the first direction in a space between the first portion and the fifth portion; and
  a fourth shock-absorbing member disposed at a position aligned to be overlapped with the third portion in the first direction in the space between the first portion and the fifth portion.

15. The fuel cell vehicle according to claim 12, wherein the shock-absorbing member comprises a fifth shock-absorbing member disposed on a rear surface of the first portion that is formed opposite the front surface of the first portion.

16. The fuel cell vehicle according to claim 15, wherein the fifth shock-absorbing member comprises a plurality of fifth shock-absorbing members spaced apart from each other in the second direction.

17. The fuel cell vehicle according to claim 9, wherein:
 the cable bumper has a first rigidity; and
 the first portion, the second portion, or the third portion comprises a shock-dispersing member having a second rigidity lower than the first rigidity.

18. The fuel cell vehicle according to claim 17, wherein the shock-dispersing member comprises:
 a first shock-dispersing member disposed in the second portion; and
 a second shock-dispersing member disposed in the third portion.

19. The fuel cell vehicle according to claim 17, wherein the shock-dispersing member is embedded in the first portion.

20. The fuel cell vehicle according to claim 17, wherein the first portion comprises:
 a first area aligned to be overlapped with the second portion in the first direction;
 a second area aligned to be overlapped with the third portion in the first direction; and
 a third area formed between the first area and the second area, wherein the shock-dispersing member is disposed in an entirety of the third area or around a middle portion of the third area.

* * * * *